United States Patent
Park (10) Patent No.: US 11,661,102 B2
(45) Date of Patent: *May 30, 2023

(54) INDEPENDENT SUSPENSION SYSTEM

(71) Applicants: HYUNDAI MOTOR COMPANY, Seoul (KR); KIA CORPORATION, Seoul (KR)

(72) Inventor: Jeong Hwan Park, Seoul (KR)

(73) Assignees: Hyundai Motor Company, Seoul (KR); Kia Corporation, Seoul (KR)

(*) Notice: Subject to any disclaimer, the term of this patent is extended or adjusted under 35 U.S.C. 154(b) by 63 days.

This patent is subject to a terminal disclaimer.

(21) Appl. No.: 17/379,494

(22) Filed: Jul. 19, 2021

(65) Prior Publication Data

US 2022/0153338 A1 May 19, 2022

(30) Foreign Application Priority Data

Nov. 19, 2020 (KR) .................. 10-2020-0155438

(51) Int. Cl.
B60G 17/00 (2006.01)
B62D 5/04 (2006.01)
(Continued)

(52) U.S. Cl.
CPC .............. B62D 5/046 (2013.01); B60G 7/001 (2013.01); B60G 7/008 (2013.01); B60G 13/005 (2013.01);
(Continued)

(58) Field of Classification Search
CPC .......... B62D 5/046; B62D 3/12; B60G 7/001; B60G 7/008; B60G 13/005; B60G 17/00;
(Continued)

(56) References Cited

U.S. PATENT DOCUMENTS 8,465,025 B2 * 6/2013 Venton-Walters ........................... B60G 17/0525
280/124.16
10,850,585 B2 * 12/2020 Yamada ............... B60K 7/0007
(Continued)

FOREIGN PATENT DOCUMENTS

CN 107471938 A * 12/2017
JP 2005-112300 A 4/2005

*Primary Examiner* — Paul N Dickson
*Assistant Examiner* — Caitlin Anne Miller
(74) *Attorney, Agent, or Firm* — Morgan, Lewis & Bockius LLP (57) ABSTRACT

An independent suspension system for a vehicle includes: a steering unit configured to be controlled to adjust the steering angle of a wheel, a shock absorber engaged with the wheel and configured to absorb impacts applied to the wheel and including a first shock absorber and a second shock absorber, each of which arranged in a forward-rearward direction on opposite side surfaces of the wheel, and a link unit disposed between the shock absorber and the steering unit in order to vary the distance between the wheel and the steering unit. The link unit includes a first upper arm disposed between the first shock absorber and the steering unit, a second upper arm disposed between the second shock absorber and the steering unit, and at least one ground clearance adjustment unit engaged with the first and second upper arms in order to vary the distance between the first and second upper arms.

13 Claims, 4 Drawing Sheets

(51) Int. Cl.
*B60G 13/00* (2006.01)
*B60G 7/00* (2006.01)
*B62D 3/12* (2006.01)
*B62D 3/04* (2006.01)

(52) U.S. Cl.
CPC .............. *B60G 17/00* (2013.01); *B62D 3/04* (2013.01); *B62D 3/12* (2013.01)

(58) Field of Classification Search
CPC .......... B60G 2200/10; B60G 2204/419; B60G 2500/10; B60G 2200/13; B60G 2204/4192; B60G 2500/30
USPC ....................................................... 280/124.1
See application file for complete search history.

(56) References Cited

U.S. PATENT DOCUMENTS

| | | | | |
|---|---|---|---|---|
| 11,383,573 | B2* | 7/2022 | Zink | B60G 3/01 |
| 11,420,490 | B2* | 8/2022 | Park | B60G 13/005 |
| 2005/0280236 | A1* | 12/2005 | Vallejos | B60G 3/01 |
| | | | | 280/124.11 |
| 2018/0334002 | A1* | 11/2018 | Kato | B60G 3/20 |
| 2021/0283970 | A1* | 9/2021 | Moriarty | H02K 7/00 |
| 2022/0153078 | A1* | 5/2022 | Park | B62D 7/023 |

\* cited by examiner

INDEPENDENT SUSPENSION SYSTEM

CROSS-REFERENCE TO RELATED APPLICATION

This application claims the benefit of priority to Korean Patent Application No. 10-2020-0155438 filed on Nov. 19, 2020 in the Korean Intellectual Property Office, the entire contents of which are incorporated herein by reference.

TECHNICAL FIELD

The present disclosure relates to an independent suspension system. More particularly, the present disclosure relates to an independent suspension system that is engaged with each wheel of a vehicle and has a structure for varying the distance between a vehicle body and the wheel, thereby providing improved ride comfort to an occupant.

BACKGROUND

A conventional vehicle suspension system connects an axle and a vehicle body in order to prevent vibration or impact, which the axle receives from the road surface while the vehicle is running, from being directly transferred to the vehicle body, thereby preventing damage to the vehicle body or cargo and improving ride comfort. In general, a suspension system includes a suspension spring, which mitigates impacts received from the road surface, a shock absorber, which dampens vibration of the suspension spring in order to improve ride comfort, and a stabilizer, which suppresses rolling of the vehicle.

A commercial vehicle mainly uses a solid-axle suspension system, in which the left wheel and the right wheel are connected via a single axle. A leaf spring or an air spring is mainly used as a suspension spring.

A steering system of such a commercial vehicle, which uses a solid-axle suspension system, includes a pitman arm, which is rotatably mounted to an output shaft of a steering gear, a drag link, which transmits the movement of the pitman arm to a knuckle arm, the knuckle arm receiving movement of the drag link to operate a knuckle spindle, and a tie rod, which connects a left knuckle arm and a right knuckle arm.

In a commercial vehicle equipped with the solid-axle suspension system using an air spring and the steering system described above, the air spring merely serves as a substitute for a leaf spring, and does not greatly contribute to improving ride comfort or steering characteristics. In addition, it is difficult to achieve precise geometry and to increase design freedom due to the structural characteristics thereof.

In recent years, there has been developed an independent-steering-type suspension system, in which a steering angle of a wheel is input to each suspension system through a motor assembly. However, the independent-steering-type suspension system described above has a problem in that a shock absorber needs to protrude in the height direction of a vehicle so as to be aligned with a steering shaft of the motor assembly.

Figure 1:
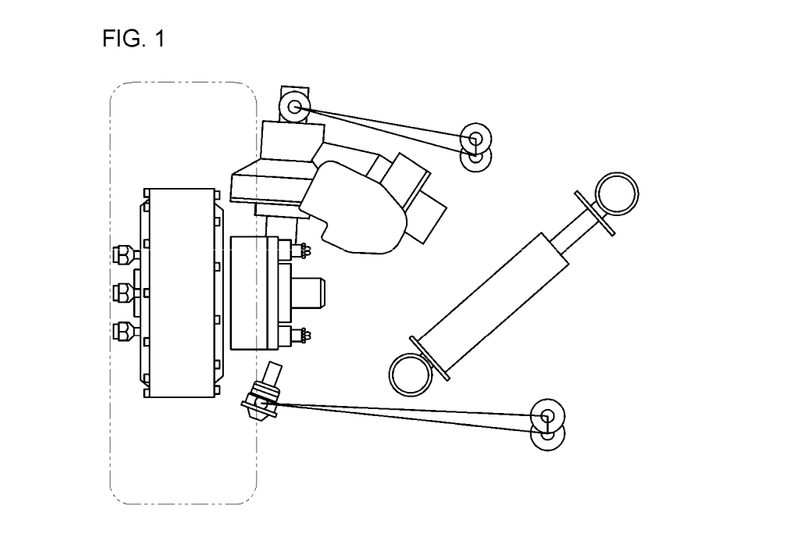
FIG. 1 is a view showing the configuration of a conventional suspension system.

In addition, as shown in FIG. 1, in a case in which one end of a shock absorber is fixed to a vehicle body frame, variation in the length of the shock absorber when the wheel travels over a bump is small, leading to deterioration in ride comfort.

For this reason, in recent years, there has been required a suspension system capable of providing improved ride comfort in various travel environments by varying the height between a wheel and a vehicle body.

The above information disclosed in this Background section is only for enhancement of understanding of the background of the disclosure, and therefore it may contain information that does not form the related art that is already known in this country to a person of ordinary skill in the art.

SUMMARY OF THE DISCLOSURE

The present disclosure has been made in an effort to solve the above-described problems associated with the related art, and it is an object of the present disclosure to provide an independent suspension system capable of varying the distance between a wheel and a vehicle body.

It is another object of the present disclosure to provide an independent suspension system capable of simultaneously controlling the movement of a link unit and variation in the vertical distance from a wheel to the link unit.

The objects of the present disclosure are not limited to the above-mentioned objects, and other objects not mentioned herein will be clearly understood by those skilled in the art from the following description, and will become apparent with reference to the embodiments of the present disclosure. In addition, the objects of the present disclosure can be accomplished by the components described in the appended claims and combinations thereof.

In one aspect, the present disclosure provides an independent suspension system for a vehicle including a steering unit configured to be controlled to adjust a steering angle of a wheel in a lateral direction, a shock absorber engaged with the wheel and configured to absorb impacts applied to the wheel and including a first shock absorber and a second shock absorber, each of which arranged in a forward-rearward direction on opposite side surfaces of the wheel, and a link unit disposed between the shock absorber and the steering unit in order to vary the distance between the wheel and the steering unit. The link unit includes a first upper arm disposed between the first shock absorber and the steering unit, a second upper arm disposed between the second shock absorber and the steering unit, and at least one ground clearance adjustment unit engaged with the first upper arm and the second upper arm in order to vary the distance between the first upper arm and the second upper arm.

The steering unit may be controlled such that a steering angle to be applied to the wheel is set by a steering input part located at a vehicle body.

The at least one ground clearance adjustment unit may include a first ground clearance adjustment unit. The first ground clearance adjustment unit may include a first rod configured so as to penetrate the first upper arm and the second upper arm, a first protrusion formed on a portion of the first rod that faces the inner surface of an opening in the second upper arm, a first slot portion formed in a portion of the first rod that faces the inner surface of an opening in the first upper arm, a first fixing portion formed on a portion of the first upper arm so as to be moved along the inner side of the first slot portion, and a driving unit engaged with the first rod to provide driving force so as to vary the distance between the first upper arm and the second upper arm.

The at least one ground clearance adjustment unit may further include a second ground clearance adjustment unit disposed adjacent to the first ground clearance adjustment unit. The second ground clearance adjustment unit may include a second rod configured so as to penetrate the first upper arm and the second upper arm, a second protrusion formed on a portion of the second rod that faces the inner surface of an opening in the first upper arm, a second slot portion formed in a portion of the second rod that faces the inner surface of an opening in the second upper arm, and a second fixing portion formed on a portion of the second upper arm so as to be moved along the inner side of the second slot portion. The driving unit may apply driving force both to the first rod and to the second rod.

The at least one ground clearance adjustment unit may include a guide unit penetrating a plate on which the steering unit is disposed, and the guide unit may be moved in an upward-downward direction according to variation in the height of the at least one ground clearance adjustment unit.

The guide unit may include a vertical guide hole formed in the plate and a guide beam located along the vertical guide hole.

The driving unit may be mounted to the guide beam.

When the first upper arm and the second upper arm are moved close to each other with respect to the ends thereof that are engaged with the steering unit, the distance between the steering unit and the wheel may be increased.

When the first upper arm and the second upper arm are moved away from each other with respect to the ends thereof that are engaged with the steering unit, the distance between the steering unit and the wheel may be reduced.

The steering input part may include a motor fixed to a vehicle body and a gear unit connected to a motor gear located in a driving part of the motor.

The gear unit may be implemented as a worm gear or a pinion gear.

Other aspects and exemplary embodiments of the disclosure are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above and other features of the disclosure are discussed infra.

The methods and apparatuses of the present invention have other features and advantages which will be apparent from or are set forth in more detail in the accompanying drawings, which are incorporated herein, and the following Detailed Description, which together serve to explain certain principles of the present disclosure.

BRIEF DESCRIPTION OF THE DRAWINGS

The above and other features of the present disclosure will now be described in detail with reference to certain exemplary embodiments thereof illustrated in the accompanying drawings which are given hereinbelow by way of illustration only, and thus are not limitative of the present disclosure.

It should be understood that the appended drawings are not necessarily to scale, presenting a somewhat simplified representation of various features illustrative of the basic principles of the disclosure. The specific design features of the present disclosure as disclosed herein, including, for example, specific dimensions, orientations, locations, and shapes, will be determined in part by the particular intended application and use environment.

In the figures, reference numbers refer to the same or equivalent parts of the present disclosure throughout the several figures of the drawing.

DETAILED DESCRIPTION

Hereinafter, exemplary embodiments of the present disclosure will be described in detail with reference to the accompanying drawings. The present disclosure may, however, be embodied in many different forms, and should not be construed as being limited to the embodiments set forth herein. Rather, these embodiments are provided so that the disclosure will be thorough and complete, and will fully convey the scope of the disclosure to those skilled in the art.

The terms "—part", "—unit", and "—system" described in the specification mean units for processing at least one function or operation, and can be implemented as hardware components, software components, or combinations of hardware components and software components.

Further, in the following description, the terms "first" and "second" are used only to avoid confusing designated components, and do not indicate the sequence or importance of the components or the relationships between the components.

An independent suspension system of the present disclosure refers to one suspension system that is engaged with each wheel. In the case of a multi-wheel vehicle, each wheel may be provided with an independent suspension system capable of achieving independent steering.

Hereinafter, the embodiment will be described in detail with reference to the accompanying drawings. In the following description and the accompanying drawings, components having the same functional configurations are denoted by the same reference numerals, and a duplicate explanation thereof will be omitted.

The present disclosure relates to an independent suspension system provided at each wheel so as to be rotatable independently.

Moreover, the present disclosure is mounted to each wheel, and is configured to allow the steering angle of the wheel to be varied without limitation. The steering angle may be controlled by a controller (not shown) so that the independent suspension system mounted to each wheel is capable of being oriented at an angle different from those of other independent suspension systems. In addition, the wheel of the present disclosure may include an in-wheel motor.

In the various embodiments of the present disclosure, the term related to a control device such as "controller", "control unit", "control device" or "control module", etc. refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure.

Further, the controller according to the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The controller may be at least one microprocessor operated by a predetermined program which may include a series of commands for carrying out the method included in the aforementioned various exemplary embodiments of the present disclosure.

In addition, the controller of the present disclosure may receive a steering input signal input to the vehicle, may receive information on the travel environment and road conditions through a sensor (not shown) mounted in the vehicle, and may vary the height of the independent suspension system.

Hereinafter, the engagement relationships between components of an independent suspension system mounted to each wheel according to an embodiment of the present disclosure will be described.

Figure 2:
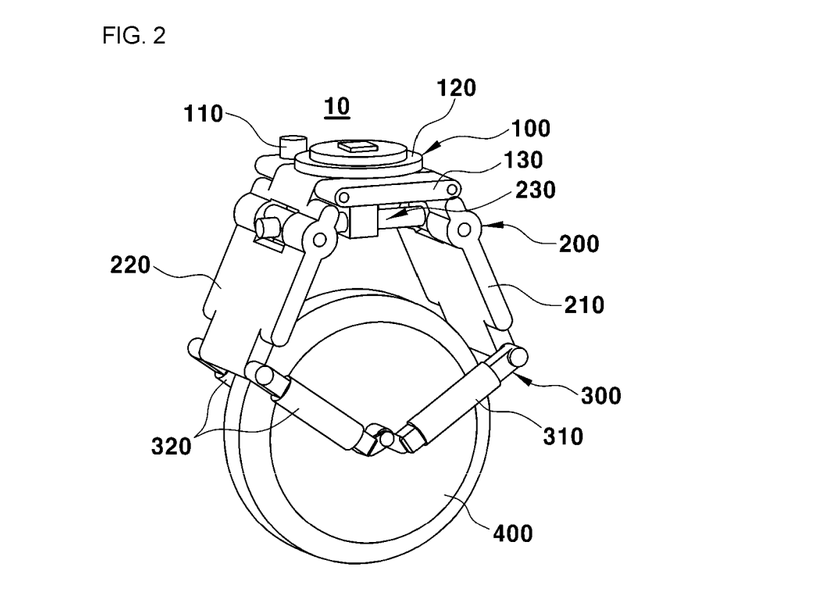
FIG. 2 is a perspective view of an independent suspension system according to an embodiment of the present disclosure.

FIG. 2 is a perspective view of an independent suspension system 10 according to an embodiment of the present disclosure.

As shown, the independent suspension system 10 includes a shock absorber 300 configured to absorb impacts applied to a wheel 400, a link unit 200 engaged with the upper end of the shock absorber 300, and a steering unit 100 disposed on the upper end of the link unit 200 and including a steering input part 110 in order to control the steering angle of the wheel 400. The link unit 200 serves to vary the distance between the steering unit 100 and the wheel 400.

The shock absorber 300 is engaged with the central shaft of the wheel 400, and extends forwards and backwards on opposite side surfaces of the wheel 400. A first shock absorber 310 may be engaged with a first upper arm 210, and a second shock absorber 320 is engaged with a second upper arm 220. Each of the first shock absorber 310 and the second shock absorber 320 includes two rods that are in contact with opposite side surfaces of the wheel 400. In other words, according to an embodiment of the present disclosure, the shock absorber 300 includes four rods engaged with the central shaft of the wheel 400. Among the four rods, the two rods extending forwards are included in the first shock absorber 310, and the two rods extending backwards are included in the second shock absorber 320.

In addition to the first and second shock absorbers 310 and 320 engaged with the central shaft of the wheel 400, the shock absorber 300 includes a wheel bush, which is surrounded by the first shock absorber 310 and the second shock absorber 320. The wheel bush may surround the central shaft of the wheel 400, and the first shock absorber 310 and the second shock absorber 320 may surround the outer surface of the wheel bush. The wheel bush of the present disclosure may be compressed or expanded along three axes by road shock and side force attributable to variation in steering angle.

The steering unit 100 includes a steering input part 110 fixed to a vehicle body and a frame 120 disposed adjacent to the steering input part 110 in order to enable the independent suspension system 10 to be integrally rotated. When a steering input signal is applied thereto from a controller, the steering input part 110 applies rotational force to the frame 120, and the frame 120 is integrally rotated with the wheel 400, whereby the steering angle of the wheel 400 is varied.

As one embodiment of the present disclosure, the steering input part 110 may include a motor fixed to a vehicle body, and a gear unit 500 engaged with the frame 120 may be implemented as a pinion gear, so the independent suspension system 10 is integrally rotated.

As another embodiment of the present disclosure, the frame 120 may be configured so as to be engaged with the gear unit 500, which is implemented as a worm gear, in order to receive rotational force from the steering input part 110 including a motor. Accordingly, the frame 120 is integrally rotated with the wheel 400 in response to the rotation of the worm gear.

The link unit 200 includes two links, which are arranged in the forward-rearward direction so as to be respectively engaged with the first shock absorber 310 and the second shock absorber 320. The link unit 200 includes a first upper arm 210 engaged with the first shock absorber 310 and a second upper arm 220 engaged with the second shock absorber 320. In addition, the link unit 200 further includes a ground clearance adjustment unit 230, which penetrates an opening in the first upper arm 210 and an opening in the second upper arm 220 and varies the distance between the steering unit 100 and the wheel 400 by varying the distance between the first upper arm 210 and the second upper arm 220. In the various embodiments, the ground clearance adjustment unit 230 may have a rode shape as shown in the drawings, however, it is not limited thereto.

The ground clearance adjustment unit 230 is located adjacent to a driving unit 240, and the driving force of the driving unit 240 is applied to the ground clearance adjustment unit 230, so the distance between the first upper arm 210 and the second upper arm 220 is varied.

The ground clearance adjustment unit 230 includes a rod 237 (238), which is disposed so as to penetrate the opening in the first upper arm 210 and the opening in the second upper arm 220, a protrusion 233 (234) formed at the rod 237 (238) so as to be inserted into one of the first and second upper arms, and a slot portion 235 (236) formed in the rod 237 (238), along which a fixing portion formed at the other one of the first and second upper arms is moved.

The driving unit 240 is engaged with a portion of the rod 237 (238), which is positioned between the first upper arm 210 and the second upper arm 220, in order to apply driving force to the rod 237 (238). The rod 237 (238) is moved in the longitudinal direction thereof between the first upper arm 210 and the second upper arm 220.

Further, when the rod 237 (238) is moved in the longitudinal direction thereof, the rod 237 (238) is also moved in the upward-downward direction of the ground clearance adjustment unit 230. The present disclosure further includes a guide unit 600 for guiding the movement of the rod 237 (238) in the upward-downward direction.

The guide unit 600 is disposed so as to penetrate a plate 130, on which the steering unit 100 is disposed, in the upward-downward direction. Specifically, a guide beam 620, which is engaged with the rod 237 (238), penetrates a guide hole 610 formed in the plate 130. The guide beam 620 guides the movement of the rod 237 (238) in the upward-downward direction while moving along the guide hole 610 in the upward-downward direction.

Figure 3:
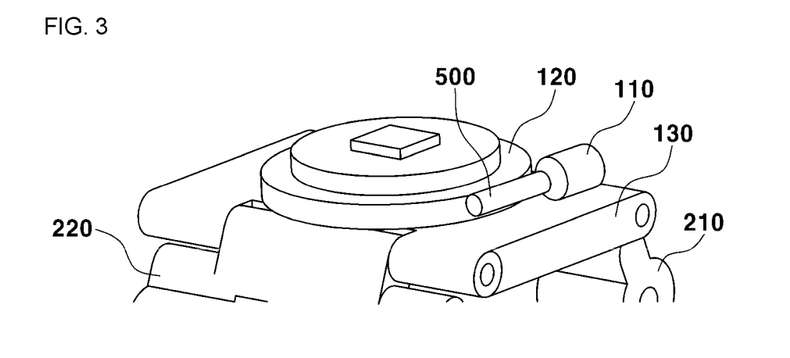
FIG. 3 is a view showing a steering unit of the independent suspension system according to an embodiment of the present disclosure.

FIG. 3 is an enlarged view of the steering unit 100 including the steering input part 110.

The steering input part 110 is engaged with the vehicle body, whereby the steering unit 100, the link unit 200, and the shock absorber are integrally rotated. The steering input part 110 may be implemented as a driving motor, and may include a gear unit 500, which is engaged with the frame 120. The gear unit 500 of the present disclosure may be implemented as a pinion gear, which is engaged with recesses formed in the frame 120.

As another embodiment of the present disclosure, the steering input part 110 may include a gear unit 500, which is implemented as a worm gear. The steering unit 100 is rotated relative to the vehicle body by the rotational force of the worm gear engaged with the motor.

The steering input part 110 described above rotates the frame 120 of the steering unit 100 in response to receipt of a steering input request by the controller, and thus the shock absorber and the link unit 200, which are engaged with the steering unit 100, are integrally rotated with the steering unit 100 in a direction corresponding to the steering input of the wheel.

Figure 4A:
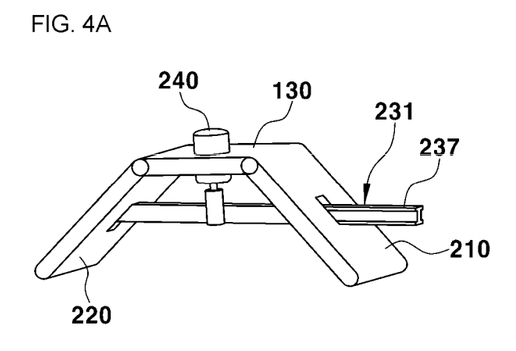
FIG. 4A is a view showing a ground clearance adjustment unit of the independent suspension system according to an embodiment of the present disclosure.

FIG. 4A is a perspective view of an independent suspension system including a first ground clearance adjustment unit 231 according to an embodiment of the present disclosure.

In the present disclosure, the ground clearance adjustment unit 230 penetrates the first upper arm 210 and the second upper arm 220, and is engaged with the driving unit 240. In this embodiment, as shown, the first ground clearance adjustment unit 231 includes a first rod 237, which is engaged at one end thereof with the second upper arm 220 and penetrates the first upper arm 210.

The first rod 237 includes first protrusions 233 so as to be engaged with the second upper arm 220. The first protrusions 233 are inserted into insertion holes formed in the inner surface of the opening in the second upper arm 220.

The first upper arm 210 includes a first fixing portion 211, which is formed on at least one inner surface of the opening in the first upper arm 210, which faces the first rod 237. The first fixing portion 211 guides the movement of the first rod 237 in the longitudinal direction in the state of being inserted into the first slot portion 235 formed in the first rod 237 in the longitudinal direction.

The first slot portion 235 restricts movement of the first fixing portion 211 in the upward-downward direction, and allows the first fixing portion 211 to be moved in the longitudinal direction of the first slot portion 235. When the first rod 237 is moved, the first fixing portion 211 is moved along the first slot portion 235 in the longitudinal direction of the first rod 237. Further, when the first slot portion 235 is integrally moved with the first rod 237 according to displacement of the first rod 237 in the height direction, the first fixing portion 211 is moved to a position corresponding to the position of the first slot portion 235 in the height direction. Therefore, the first upper arm 210 is integrally moved with the first rod 237 due to the first fixing portion 211, which is moved according to displacement of the first rod 237.

The first slot portion 235 may be formed to have a length equal to or greater than the distance that the first rod 237 can be moved in the longitudinal direction by the driving force of the driving unit 240. When the first rod 237 is moved, the first slot portion 235 is integrally moved with the first rod 237 in the state in which the first fixing portion 211 is located inside the first slot portion 235.

Figure 4B:
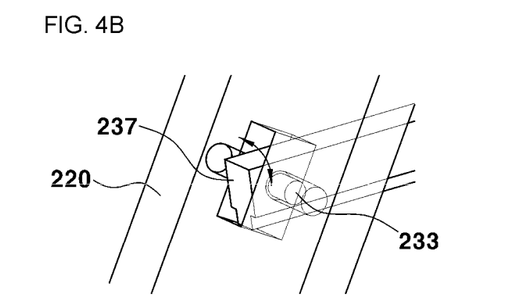
FIG. 4B is an enlarged view of a second upper arm of a first ground clearance adjustment unit according to an embodiment of the present disclosure.

FIG. 4B is an enlarged view of the first rod 237 engaged with the opening in the second upper arm 220 as one embodiment of the present disclosure.

One end of the first rod 237 is located inside the opening in the second upper arm 220. The first rod 237 includes first protrusions 233, which are formed on opposite side surfaces thereof that face the inner surface of the opening in the second upper arm 220. The first protrusions 233 are inserted into insertion holes formed in the inner surface of the opening in the second upper arm 220, which faces the first protrusions 233. Therefore, the first protrusions 233 are moved together with the second upper arm 220 when the first rod 237 is moved in the longitudinal direction.

Further, the first protrusions 233 are provided so as to be rotatable inside the insertion holes. Therefore, the angle formed by the first rod 237 and the second upper arm 220 is varied when the first rod 237 is moved in the longitudinal direction. When the driving force of the driving unit 240 is applied thereto, the first rod 237 causes variation in the distance between the first upper arm 210 and the second upper arm 220, and the angle between the first rod 237 and the second upper arm 220 is varied according to variation in the distance between the first upper arm 210 and the second upper arm 220. Further, upon variation in the angle between the first rod 237 and the second upper arm 220, the first rod 237 is rotated about the first protrusions 233, so the first rod 237 is maintained in a horizontal orientation between the first upper arm 210 and the second upper arm 220.

Figure 4C:
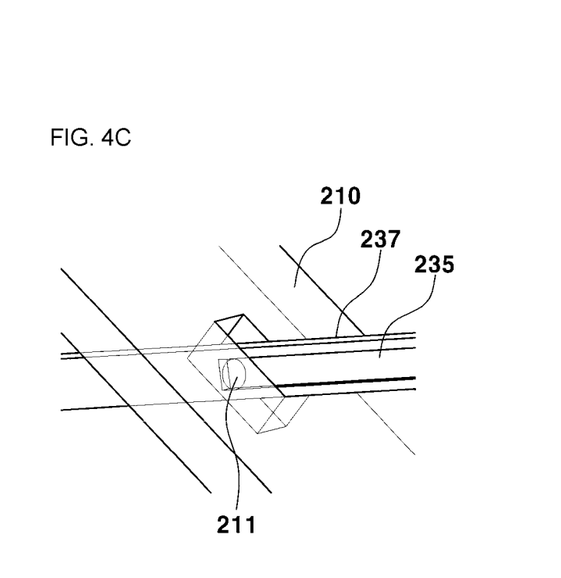
FIG. 4C is a view showing the engagement structure of a first upper arm of the first ground clearance adjustment unit according to an embodiment of the present disclosure.

FIG. 4C shows the engagement relationships between the first slot portion 235 formed in the first rod 237 and the first fixing portion 211 formed at the first upper arm 210 as one embodiment of the present disclosure.

As shown, the first rod 237 extends while penetrating the opening in the first upper arm 210, and includes the first slot portion 235, which is formed in a portion thereof that faces the first upper arm 210.

The first slot portion 235 is formed to allow the first fixing portion 211, which is formed on the inner surface of the opening in the first upper arm 210, to be inserted thereinto. Further, when the first rod 237 is moved in the longitudinal direction, the first slot portion 235 guides the movement of the first fixing portion 211.

When the first rod 237 is moved in the longitudinal direction, the first rod 237 may be rotated about the first fixing portion 211, and the angle formed by the first upper arm 210 and the first rod 237 may be equal to the angle formed by the second upper arm 220 and the first rod 237. Further, when the first rod 237 is moved in the longitudinal direction, the first rod 237 may be rotated about the first fixing portion 211, and at the same time, the first rod 237 may be rotated about the first protrusions 233, which are engaged with the second upper arm 220. Accordingly, the first rod 237 may be maintained parallel to the plate 130, on which the steering unit 100 is disposed, while varying the distance between the first upper arm 210 and the second upper arm 220.

As described above with reference to FIGS. 4B to 4C, the first rod of the first ground clearance adjustment unit 231 includes the first protrusions 233 and the first fixing portion 211 so as to vary the distance between the first upper arm 210 and the second upper arm 220 and to be maintained parallel to the plate 130 while varying the distance therebetween.

Figure 5:
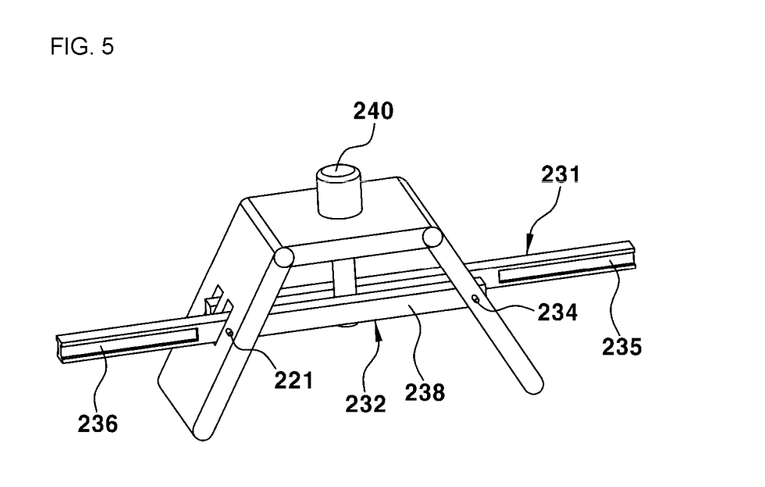
FIG. 5 is a view showing the engagement structure of first and second ground clearance adjustment units according to an embodiment of the present disclosure.

FIG. 5 shows an independent suspension system including a first ground clearance adjustment unit 231 and a second ground clearance adjustment unit 232 as another embodiment of the present disclosure.

This embodiment of the present disclosure includes a first ground clearance adjustment unit 231, which is the same as shown in FIG. 4A, and further includes a second ground clearance adjustment unit 232, which is disposed adjacent to the first ground clearance adjustment unit 231. That is, referring to FIG. 5, the first ground clearance adjustment unit 231 and the second ground clearance adjustment unit 232 may disposed adjacent facing each other, extending in opposite directions away from the driving unit 240.

The second ground clearance adjustment unit 232 has a configuration equivalent to the configuration of the first ground clearance adjustment unit 231. That is, the second ground clearance adjustment unit 232, which is disposed adjacent to the first ground clearance adjustment unit 231, includes a second rod 238, which penetrates the first upper arm 210 and the second upper arm 220. The second rod 238 includes second protrusions 234, which are inserted into insertion holes formed in the inner surface of the opening in the first upper arm 210.

In addition, the second rod 238 includes a second slot portion 236 formed therein to allow a second fixing portion 221, which is formed on the inner surface of the opening in the second upper arm 220, to be inserted thereinto. The second slot portion 236 may be formed to have a length equal to or greater than the distance that the second rod 238 can be moved in the longitudinal direction. When the second rod 238 is moved in the longitudinal direction, the second fixing portion 221 is maintained in the state of being inserted into the second slot portion 236.

The angle formed by the second rod 238 and the first upper arm 210 centered on the second protrusions 234 can be varied, and the angle formed by the second upper arm 220 and the second rod 238 centered on the second fixing portion 221 can be varied. Therefore, when the second rod 238 is moved in the longitudinal direction, the distance between the first upper arm 210 and the second upper arm 220 is varied, and at the same time, the second rod 238 is maintained parallel to the plate 130. Further, the first rod 237 and the second rod 238 are maintained parallel to each other.

The second rod 238 is disposed adjacent to the first rod 237. Preferably, the first rod 237 and the second rod 238 are arranged opposite each other, with the driving shaft of the driving unit 240 interposed therebetween.

Figure 6:
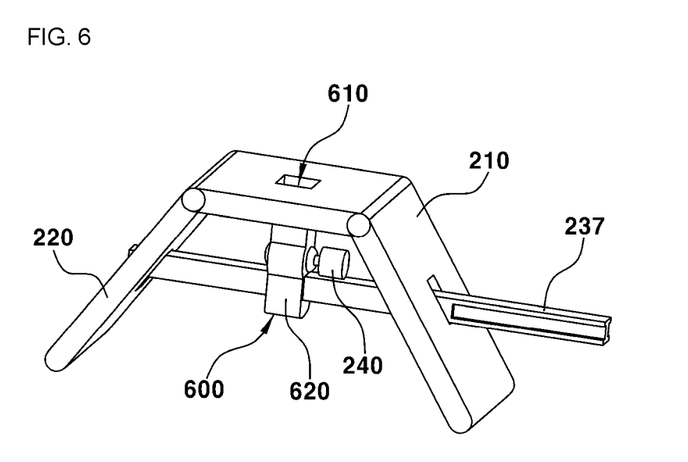
FIG. 6 is a view showing the engagement relationships between a ground clearance adjustment unit and a guide unit according to an embodiment of the present disclosure.

FIG. 6 shows the configuration of the guide unit 600 for guiding the movement of the ground clearance adjustment unit 230 in the height direction as one embodiment of the present disclosure.

As shown, the guide unit 600 is engaged with a portion of the rod 237 (238), which is positioned between the first upper arm 210 and the second upper arm 220. The driving unit 240 may be mounted to the guide unit 600. The guide unit 600 serves to guide the movement of the rod 237 (238) in the height direction, which occurs when the rod 237 (238) is moved in the longitudinal direction.

In one embodiment of the present disclosure, the guide unit 600 is disposed so as to penetrate the plate 130. Specifically, the guide unit 600 includes a guide beam 620, which is inserted through the guide hole 610 formed in the plate 130. The guide beam 620 may be formed to have an H-shaped cross-section, and the guide hole 610 may be formed to have a cross-sectional shape that substantially corresponds to the cross-sectional shape of the guide beam 620.

One end of the guide beam 620 is engaged with the rod 237 (238), and the driving unit 240, which is mounted to the guide beam 620, is disposed adjacent to the rod 237 (238). One end of the guide beam 620 may be engaged with the rod 237 (238), and the driving unit 240 may be integrated with the guide beam 620 so as to be engaged with the upper end of the rod 237 (238).

When the driving force of the driving unit 240 is applied thereto, the rod 237 (238) is moved in the longitudinal direction, thereby varying the distance between the first upper arm 210 and the second upper arm 220. The rod 237 (238), which is moved in the longitudinal direction, is also moved in the height direction depending on the distance between the first upper arm 210 and the second upper arm 220. The guide beam 620 penetrates the guide hole 610 in order to guide the movement of the rod 237 (238) in the height direction.

When the rod 237 (238) is located at the uppermost position in the height direction, the upper end of the guide beam 620 may be located above the plate 130, and when the rod 237 (238) is located at the lowermost position in the height direction, the upper end of the guide beam 620 may be maintained in the state of being inserted at least partway into the guide hole 610.

As is apparent from the above description, the present disclosure provides the following effects through the above embodiments and through the configurations and combination and use relationships described above.

The independent suspension system according to various embodiments of the present disclosure is capable of varying the distance between a vehicle body and a wheel depending on the environment in which a vehicle travels, thereby improving ride comfort.

In addition, the independent suspension system according to various embodiments of the present disclosure includes one or more ground clearance adjustment units, thus exhibiting improved durability.

The aforementioned disclosure can also be embodied as computer readable codes on a computer readable recording medium. The computer readable recording medium is any data storage device that can store data which may be thereafter read by a computer system. Examples of the computer readable recording medium include hard disk drive (HDD), solid state disk (SSD), silicon disk drive (SDD), read-only memory (ROM), random-access memory (RAM), CD-ROMs, magnetic tapes, floppy discs, optical data storage devices, etc. and implementation as carrier waves (e.g., transmission over the Internet).

In various exemplary embodiments of the present disclosure, each operation described above may be performed by a control device, and the control device may be configured by a plurality of control devices, or an integrated single control device.

In various exemplary embodiments of the present disclosure, the control device may be implemented in a form of hardware or software, or may be implemented in a combination of hardware and software.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The above description is illustrative of the present disclosure. Also, the above disclosure is intended to illustrate and explain preferred embodiments of the present disclosure, and the present disclosure may be used in various other combinations, modifications, and environments. In other words, the present disclosure may be changed or modified within the scope of the concept of the disclosure disclosed herein, within the equivalent scope of the disclosure, and/or within the skill and knowledge of the art. The described embodiments illustrate the best state of the art to implement the technical idea of the present disclosure, and various changes may be made thereto as demanded for specific applications and uses of the present disclosure. Accordingly, the above description is not intended to limit the present disclosure to the embodiments. Also, the appended claims should be construed as encompassing such other embodiments.

What is claimed is:

1. An independent suspension system of a vehicle, comprising:
   a steering unit configured to be controlled to adjust a steering angle of a wheel;
   a shock absorber engaged with the wheel and configured to absorb impacts applied to the wheel, the shock absorber comprising a first shock absorber and a second shock absorber, each of which arranged in a forward-rearward direction on opposite side surfaces of the wheel; and
   a link unit disposed between the shock absorber and the steering unit, the link unit being configured to vary a distance between the wheel and the steering unit,
   wherein the link unit comprises:
   a first upper arm disposed between the first shock absorber and the steering unit;
   a second upper arm disposed between the second shock absorber and the steering unit; and
   at least one ground clearance adjustment unit engaged with the first upper arm and the second upper arm, the at least one ground clearance adjustment unit being configured to vary a distance between the first upper arm and the second upper arm.

2. The independent suspension system of claim 1, wherein the steering unit is controlled such that the steering angle to be applied to the wheel is set by a steering input part located at a vehicle body of the vehicle.

3. The independent suspension system of claim 1, wherein the at least one ground clearance adjustment unit comprises a first ground clearance adjustment unit, and
   wherein the first ground clearance adjustment unit comprises:
   a first rod extending through the first upper arm and the second upper arm;
   a first protrusion extending on a first portion of the first rod, the first portion facing an inner surface of an opening in the second upper arm;
   a first slot portion defined in a second portion of the first rod, the second portion of the first rod facing an inner surface of an opening in the first upper arm;
   a first fixing portion disposed on the first upper arm and movably disposed along an inner side of the first slot portion; and
   a driving unit engaged with the first rod to provide a driving force for varying the distance between the first upper arm and the second upper arm.

4. The independent suspension system of claim 3, wherein the at least one ground clearance adjustment unit further comprises a second ground clearance adjustment unit disposed adjacent to face the first ground clearance adjustment unit,
   wherein the second ground clearance adjustment unit comprises: a second rod extending through the first upper arm and the second upper arm;
   a second protrusion disposed on a third portion of the second rod, the third portion facing an inner surface of an opening in the first upper arm;
   a second slot portion defined in a fourth portion of the second rod, the fourth portion facing an inner surface of an opening in the second upper arm; and
   a second fixing portion disposed on the second upper arm and movably disposed along an inner side of the second slot portion, and
   wherein the driving unit is configured to be controlled to apply the driving force both to the first rod and to the second rod.

5. The independent suspension system of claim 1, wherein the at least one ground clearance adjustment unit comprises a guide unit penetrating a plate on which the steering unit is disposed, and
   wherein the guide unit is configured to move in an upward-downward direction according to variation in a height of the at least one ground clearance adjustment unit.

6. The independent suspension system of claim 5, wherein the guide unit comprises:
   a vertical guide hole penetrating through the plate; and
   a guide beam located along the vertical guide hole.

7. The independent suspension system of claim 6, wherein the driving unit is fixedly disposed on the guide beam.

8. The independent suspension system of claim 1, wherein, when the first upper arm and the second upper arm are controlled to move closer to each other with respect to ends of the first upper arm and the second upper arm, respectively, that are engaged with the steering unit, the distance between the steering unit and the wheel becomes larger.

9. The independent suspension system of claim 1, wherein, when the first upper arm and the second upper arm are controlled to move farther from each other with respect to ends of the first upper arm and the second upper arm, respectively, that are engaged with the steering unit, the distance between the steering unit and the wheel becomes smaller.

10. The independent suspension system of claim 2, wherein the steering input part comprises:
    a motor fixedly disposed on the vehicle body; and
    a gear unit connected to a motor gear located in the motor.

11. The independent suspension system of claim 10, wherein the gear unit includes a worm gear or a pinion gear.

12. The independent suspension system of claim 11, wherein the first shock absorber and the second shock absorber are connected to each other at a center of the wheel, and
    wherein each of the first shock absorber and the second shock absorber includes a set of arms symmetrically located at the opposite sides of the wheel.

13. The independent suspension system of claim 4, wherein the first ground clearance adjustment unit and the second ground clearance adjustment unit are spaced apart from each other and facing each other by the driving unit.

* * * * *